No. 892,182. PATENTED JUNE 30, 1908.
M. PETZER.
FRUIT PICKER.
APPLICATION FILED MAR. 12, 1908.

Inventor
M. Petzer

Witnesses

By H. P. Everts
Attorneys

UNITED STATES PATENT OFFICE.

MARTIN PETZER, OF WILKINSBURG, PENNSYLVANIA.

FRUIT-PICKER.

No. 892,182.     Specification of Letters Patent.     Patented June 30, 1908.

Application filed March 12, 1908. Serial No. 420,668.

*To all whom it may concern:*

Be it known that I, MARTIN PETZER, a citizen of the United States of America, residing at Wilkinsburg, in the county of Allegheny and State of Pennsylvania, have invented certain new and useful Improvements in Fruit-Pickers, of which the following is a specification, reference being had therein to the accompanying drawing.

This invention relates to a fruit picker, and the primary object of my invention is, to provide simple and effective means for removing fruit from the limbs or branches of a tree, without injuring the same or the fruit.

Another object of this invention is to provide an inexpensive fruit picker that can be easily manipulated to strip a branch or limb of fruit.

With the above and other objects in view which will more readily appear as the invention is better understood, the same consists in the novel construction, combination and arrangement of parts to be presently described and then specifically claimed.

Figure 1:
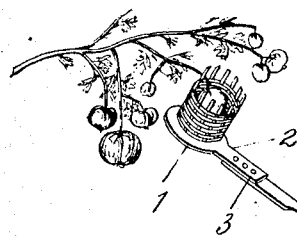
Figure 2:
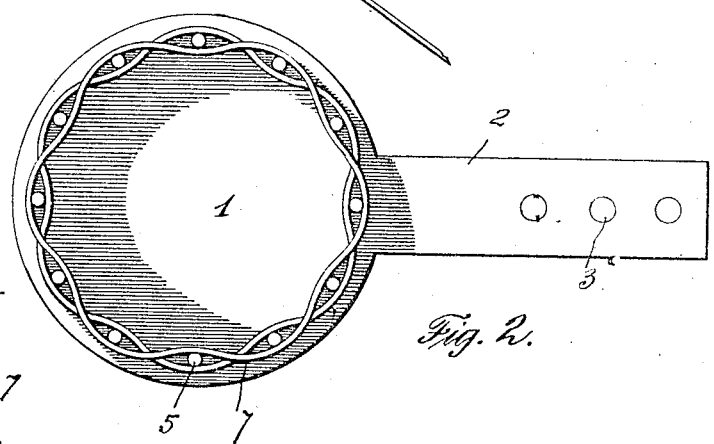
Figure 3:
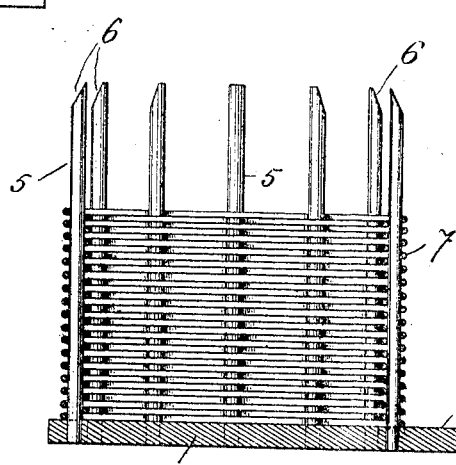

In the drawings: Figure 1 is a perspective view of my fruit picker, Fig. 2 is a plan of the same, Fig. 3 is a vertical sectional view of a portion of the same, and Fig. 4 is an elevation of a modified form of basket structure.

To put my invention into practice, I provide a circular plate 1 with an extension 2 that can be riveted or otherwise secured, as at 3, to a handle or rod 4. The plate 1 is provided with a plurality of circumferentially arranged standards or rods 5 having upper beveled ends 6. Woven in and out of the standards or rods 5 are reeds 7, providing a basket-like structure or receptacle for receiving fruit, this receptacle being approximately half the depth or length of the standards 5.

By simply placing the basket-like structure or receptacle beneath the fruit to be picked, as illustrated in Fig. 1, and pulling upon the rod or handle 4, the fruit can be easily stripped from the branch, and is received and retained in the basket until the same is lowered and the fruit removed. The standards or rods 5 extending above the reeds 7 permit of the branch or limb being embraced or caught between two of the standards or rods, whereby the fruit can be easily stripped from the limb or branch without injuring either. The beveled ends 6 of the standards 5 easily guide a limb into position to be stripped of its fruit.

Figure 4:
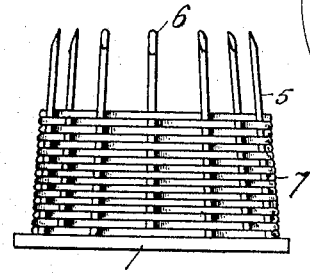

In Fig. 4 of the drawings, I have illustrated a slight modification of my invention wherein the standards or rods 5 are inclined inwardly so that the receptacle is somewhat tapering in form.

Having now described my invention what I claim as new, is:—

A fruit picker comprising a plate, a handle carried thereby, a plurality of circumferentially arranged standards carried by said plate, and reeds woven in and out of said standards to provide a basket-like structure of approximately half the length of said standards.

In testimony whereof I affix my signature in the presence of two witnesses.

MARTIN PETZER.

Witnesses:
   MAX H. SROLOVITZ,
   A. J. TRIGG.